Patented Aug. 6, 1929.

1,723,614

UNITED STATES PATENT OFFICE.

WOLFGANG GRUBER, OF BURGHAUSEN, OBERBAYERN, GERMANY, ASSIGNOR TO DR. ALEXANDER WACKER GESELLSCHAFT FUR ELECTROCHEMISCHE INDUSTRIE, OF MUNICH, GERMANY, A CORPORATION OF GERMANY.

PROCESS FOR PREPARING ACETONE-SOLUBLE, HIGH-VISCOSITY CELLULOSE ACETATE.

No Drawing. Application filed November 1, 1928, Serial No. 316,614, and in Germany January 9, 1926.

The object of this invention is to provide a process for the preparation of high viscosity cellulose acetate, which is soluble in acetone.

A further object is to provide a process that is simple in operation and that is carried out at atmospheric temperature.

Many processes for the preparation of acetone soluble cellulose acetate from the triacetate are known. These processes include making the cellulose triacetate or primary acetate soluble in acetone by heating with dilute sulfuric acid, or by partial saponification with dilute mineral acids, either alone or in the presence of a high percentage of acetic acid. Other processes include heating the triacetate with a small amount of water and bisulfates, or with sulfates or neutral salts. Further processes include heating the triacetate with glacial acetic acid, small quantities of alcohol, glycerin, either with or without catalysts, in the absence of water. Solubility in acetone may be also attained by heating the triacetate in 90-95% acetic acid up to 100-110° C. without catalysts.

The great objection to all these processes is that relatively high temperatures must be used except in the acid treatment processes which, however, have the undesirable effect of breaking down the molecules and causing a reduction in the viscosity of the cellulose acetate as a result.

I have now made the unexpected observation that the triacetate will readily become soluble in acetone at atmospheric temperatures when treated with the heavy metal acid salts of the first and second group of the periodic system containing water of crystallization or with mixtures of these salts by themselves or with other acid or neutral salts.

Among these heavy metal acid salts may be mentioned the following: $ZnCl_2.HCl.H_2O$; $3HgCl_2.4HCl.14H_2O$; $CuCl_2.HCl.2H_2O$; $Na_2ZnCl_4.3H_2O$.

The following neutral salts may be used in admixture with the above salts: $CaCl_2.6H_2O$; $ZnCl_2.3H_2O$; $CuCl_2.3H_2O$; $MgCl_2.6H_2O$.

The product of my process exhibits a much higher viscosity than the products of any of the hitherto known processes. This characteristic high viscosity is a strong indication that no molecular reduction takes place in my process.

The following specific examples of my process are given:

*Example I:* 100 parts of cellulose triacetate prepared by any well known method, were dissolved in 500 parts glacial acetic acid and allowed to stand with 80 parts $ZnCl_2.HCl.2H_2O$ at 20° C. After 10-15 hours complete solubility of the product in acetone resulted. The precipitation of the final product with water was carried out as usual.

*Example II:* Cellulose, acetylated by means of acetic anhydride and zinc chloride, was mixed, after decomposition of the acetic anhydride still left in the mixture, with $ZnCl_2.HCl.H_2O$ in the above proportions, and treated as in Example I. In place of the $ZnCl_2.HCl.H_2O$ there can be added HCl and water in such amount that they will form with the $ZnCl_2$ already in the solution $ZnCl_2.HCl.H_2O$.

*Example III:* 100 parts cellulose, acetylated by means of acetic anhydride and sulfuric acid, were mixed after decomposition of the anhydride still present, with 5 parts $ZnCl_2.HCl.H_2O$ and 50 parts $CaCl_2.6H_2O$ at atmospheric temperature and treated from thereon as in Example I.

*Example IV:* 100 parts cellulose triacetate, dissolved in 300 parts glacial acetic acid, were mixed at atmospheric temperature with 60 parts of $3HgCl_2.4HCl.14H_2O$ and then treated as in Example I.

I claim:

1. Process of preparing acetone-soluble, high viscosity cellulose acetate comprising treating acetone-insoluble cellulose acetate in solution with an acid chloride of a metal of the group consisting of zinc, mercury and copper.

2. Process of preparing acetone-soluble, high viscosity cellulose acetate, comprising treating an acetone-insoluble cellulose acetate in solution with an acid chloride of a metal of the group consisting of zinc, mercury and copper containing water of crystallization.

3. Process of preparing acetone-soluble, high viscosity cellulose acetate comprising treating at atmospheric temperature an acetone-insoluble cellulose acetate in solution with an acid chloride of a metal of the group consisting of zinc, mercury and copper containing water of crystallization.

4. Process of preparing acetone-soluble, high viscosity cellulose acetate comprising treating acetone-insoluble cellulose tri-acetate dissolved in acetic acid with an acid chloride of a metal of the group consisting of zinc, mercury and copper containing water of crystallization.

5. Process of preparing acetone-soluble, high viscosity cellulose acetate comprising treating at atmospheric temperature an acetone-insoluble cellulose tri-acetate in acetic acid solution with an acid chloride of a metal of the group consisting of zinc, mercury and copper.

6. Process of preparing an acetone-soluble, high viscosity cellulose acetate comprising treating an acetone-insoluble cellulose acetate in acetic acid solution with an acid chloride of a metal of the group consisting of zinc, mercury and copper containing water of crystallization and then adding water to the solution to precipitate the cellulose acetate.

7. Process of preparing acetone-soluble, high viscosity cellulose acetate comprising treating at atmospheric temperature an acetone-insoluble cellulose triacetate in acetic acid solution with an acid chloride of a metal group consisting of zinc, mercury and copper containing water of crystallization and then adding water to the solution to precipitate the cellulose acetate.

8. Process for preparing acetone-soluble high viscosity cellulose acetate comprising dissolving one hundred parts acetone insoluble cellulose triactate in five hundred parts of glacial acetic acid, adding eighty parts of $ZnCl_2.HCl.2H_2O$, allowing the mixture to stand for ten to fifteen hours, and then precipitating the cellulose acetate by the addition of water.

9. Process for preparing acetone-soluble high viscosity cellulose acetate comprising dissolving one hundred parts of acetone-insoluble cellulose triacetate in glacial acetic acid and adding eighty parts of $ZnCl_2.HCl.2H_2O$, allowing the mixture to stand for at least ten hours, and then precipitating the cellulose acetate by the addition of water.

10. Process for preparing acetone-soluble high viscosity cellulose acetate comprising dissolving acetone insoluble cellulose triacetate in glacial acetic acid and adding $ZnCl_2.HCl.2H_2O$ thereto, allowing the mixture to stand for approximately ten to fifteen hours, and then precipitating the cellulose acetate.

11. Process for preparing acetone-soluble high viscosity cellulose acetate comprising dissolving acetone insoluble cellulose triacetate in glacial acetic acid and adding acid zinc chloride containing water of crystallization, allowing the mixture to stand for approximately ten to fifteen hours, and then precipitating the cellulose acetate.

Singed at Munich, State of Bavaria (Germany); this 19th day of October A. D. 1928.

DR. WOLFGANG GRUBER.